United States Patent [19]

Schall et al.

[11] Patent Number: 5,672,379
[45] Date of Patent: Sep. 30, 1997

[54] METHOD OF PRODUCING WEAR RESISTANT TRAFFIC MARKINGS

[75] Inventors: Donald Craig Schall; Alvin Charles Lavoie, both of Lansdale; Francis Joseph Landy, Jenkintown; Steven Scott Edwards, Horsham, all of Pa.

[73] Assignee: Rohm and Haas Company, Philadelphia, Pa.

[21] Appl. No.: 687,851

[22] Filed: Jul. 26, 1996

[51] Int. Cl.$^6$ ....................................... B05D 5/06
[52] U.S. Cl. ............. 427/137; 427/385.5; 427/393.6
[58] Field of Search .................... 427/136, 137, 427/385.5, 393.6

[56] References Cited

U.S. PATENT DOCUMENTS

| | | | |
|---|---|---|---|
| 4,812,493 | 3/1989 | Cummings | 523/412 |
| 5,340,870 | 8/1994 | Clinnin et al. | 524/522 |
| 5,527,853 | 6/1996 | Landy et al. | 524/521 |
| 5,534,310 | 7/1996 | Rokowski et al. | 427/494 |

FOREIGN PATENT DOCUMENTS

| | | |
|---|---|---|
| 525977 | 2/1993 | European Pat. Off. . |
| 6271789 | 9/1994 | Japan . |
| 9421738 | 9/1994 | WIPO . |
| 9509208 | 4/1995 | WIPO . |
| 9622338 | 7/1996 | WIPO . |

*Primary Examiner*—Shrive Beck
*Assistant Examiner*—Erma Cameron
*Attorney, Agent, or Firm*—Sudhir G. Deshmukh

[57] ABSTRACT

The present invention is directed to a method of producing wear resistant traffic paint composition. In accordance with the method, a traffic marking of a traffic paint composition having low GPC number average molecular weight latex binder when applied to the road surface exhibits improved wear resistance over those traffic paint compositions having high GPC number average molecular weight latex binders. The wear resistance is further enhanced by modifying the latex polymer used in the composition with acetoacetyl functional pendant moiety and amino silane.

18 Claims, No Drawings

METHOD OF PRODUCING WEAR RESISTANT TRAFFIC MARKINGS

This is a nonprovisional application of prior pending provisional application Ser. No. 60/004,201, filed Sep. 22, 1995.

This invention generally relates to a method of producing traffic markings on road surfaces and more particularly to producing wear resistant traffic markings on road surfaces further having fast dry characteristic under high humidity conditions.

White and yellow traffic markings used for demarcating traffic lanes is a common sight on almost all roads. These markings ensure safe driving conditions under varying weather conditions. The term "roads" generally means routes, highways, exit and entry ramps, passes, pavements, side walks or parking lots for vehicles, such as, autos, bikes, trucks, and the roads are usually paved with asphalt or concrete, generally made from Portland cement. The majority of these traffic markings, such as, solid, transverse or interrupted stripes, are paint-based and traditionally include solvent-borne binders, which are predominantly alkyds and chlorinated rubber-modified alkyds. Since traditional traffic paint coatings contain high levels [19 kilograms per kilometer per year-(Environmental Protection Agency supplied data)] of volatile organic compounds (VOC), they contribute to ozone layer depletion which thereby endangers the environment. Under the increasingly stricter standards of The Clean Air Act, as amended in 1990, high levels of VOC produced by the traditional traffic paint coatings must be substantially reduced.

In the early 1980s, waterborne traffic paints began to receive serious consideration as an environmentally safer alternative to the traditional traffic paints. These waterborne traffic paints are primarily based on acrylic emulsions. In addition to dramatically lowering VOC emissions [3.7 kilograms per kilometer per year-(Environmental Protection Agency supplied data)], they also improve retention of glass beads used in light reflective traffic markings. As a result, the useful life of the traffic markings on the roads is extended.

However, these conventional waterborne traffic markings tend to be less wear resistant than traditional alkyd based traffic paints when exposed to traffic conditions, such as, wear and tear resulting from exposure to vehicular traffic. The term wear resistance means the degree of resistance of film detachment from the road surface when it is exposed to the traffic conditions. The wear resistance is expressed as the percentage area of a film of traffic marking still remaining on the road surface after its extended exposure to such traffic conditions. Under American Society of Testing Materials (ASTM), Philadelphia, Pa., Test No. D 713-90, a traffic marking is considered to have failed if less than 40 percent of the traffic marking at the end of a selected test period, typically one year, remains on the road surface when such a test marking is applied transverse to traffic for accelerating its wear. It has been found that a substantial portion of conventional waterborne traffic markings tend to wear away in less than a few months after exposure to such accelerated traffic conditions. The method of the present invention solves this problem by improving the wear resistance of the of the traffic paint composition.

One of the advantages of the method of the present invention is its fast dry characteristic even under high humidity conditions.

Still another adavantage of the present method is the pot life stability of the traffic paint composition used therein.

The present invention is directed to a method for producing a wear resistant traffic marking on a road surface comprising:

applying on said road surface a layer of a traffic paint composition containing a latex binder in an aqueous evaporable carrier, said latex binder having a Tg in the range varying from 0° C. to 60° C., a GPC number average molecular weight in the range varying from 1,000 to less than 30,000; and evaporating said aqueous evaporable carrier from said layer to form said wear resistant traffic marking on said road surface.

If desired, the traffic paint composition used above in the method of the present invention may further include:
  (a) a volatile base added to said aqueous evaporable carrier; and
  (b) a blend of said latex binder with 0 to 20 weight percent based on the total weight of said binder solids of a polyfunctional amine, or
  (c) an amine modified latex binder, or
  (d) a combination of said blend and said amine modified latex binder, wherein said latex binder and said amine modified latex binder are anionically stabilized, and wherein said aqueous evaporable carrier comprises an amount of said volatile base sufficient to raise the pH of said aqueous evaporable carrier to a point where essentially all of said polyfunctional amine in said blend, or essentially all of said amine modified latex binder, or essentially all of said combination of said blend and said amine modified latex binder is in a deprotonated state.

The present invention is also directed to a method for producing a wear resistant traffic marking on a road surface comprising:

applying on said road surface a layer of a traffic paint composition containing an aminosilane added to an aqueous evaporable carrier maintained at a pH in the range of from of 7.5 to 11.0 and having dispersed therein particles of a latex binder bearing an acid functional pendant moiety and an enamine functional pendant moiety, wherein said enamine functional pendant moiety results from the reaction of an acetoacetyl functional pendant moiety on said latex binder with ammonia or amine, said binder having a Tg in range varying from 0° C. to 60° C., a GPC number average molecular weight in the range varying from 1,000 to 1000,000, and an acid number in the range varying from 0.1 to 390; and evaporating said aqueous evaporable carrier from said layer to form said traffic marking having improved wear resistance.

If desired, the traffic paint composition used above in the method of the present invention may further include:
  (a) a blend of said latex binder with 0 to 20 weight percent based on the total weight of said binder solids of a polyfunctional amine, or
  (b) an amine modified latex binder, or
  (c) a combination of said blend and said amine modified latex binder, wherein said latex binder and said amine modified latex binder are anionically stabilized, and wherein said aqueous evaporable carrier comprises an amount of said volatile base sufficient to raise the pH of said aqueous evaporable carrier to a point where essentially all of said polyfunctional amine in said blend, or essentially all of said amine modified latex binder, or essentially all of said combination of said blend and said amine modified latex binder is in a deprotonated state.

As used herein:

"GPC number average molecular weight" means the number average molecular weight determined by gel permeation chromatography (GPC) which is described on page 4, Chapter I of The Characterization of Polymers published by Roban and Haas Company, Philadelphia, Pa. in 1976, utilizing polymethyl methacrylate as the standard. The GPC number average molecular weight can be estimated by calculating a theory number average molecular weight. In systems containing chain transfer agents, the theory number average molecular weight is simply the total weight of polymerizable monomer in grams divided by the total molar amount of chain transfer agent used during the polymerization. Estimating the molecular weight of an emulsion polymer system that does not contain a chain transfer agent is more complex. A cruder estimate can be obtained by taking the total weight of polymerizable monomer in grams and dividing that quantity by the product of the molar amount of an initiator multiplied by an efficiency factor (in our persulfate initiated systems, we have used a factor of approximately 0.5). Further information on theoretical molecular weight calculations can be found in *Principles of Polymerization* 2nd edition, by George Odian published by John Wiley and Sons, N.Y., N.Y. in 1981 and in *Emulsion Polymerization* edited by Irja Pirma published by Academic Press, N.Y., N.Y. in 1982.

"Low GPC number average molecular weight polymer" means a polymer having GPC number average molecular weight in the range of 1000 to less than 30,000.

"High GPC number average molecular weight polymer" means a polymer GPC number average molecular weight in the range of more than 30,000 to 1,000,000.

"Glass transition temperature (Tg)" is a narrow range of temperature, as measured by conventional differential scanning calorimetry (DSC), during which amorphous polymers change from relatively hard brittle glasses to relatively soft viscous rubbers. To measure the Tg by this method, the copolymer samples were dried, preheated to 120° C., rapidly cooled to −100° C., and then heated to 150° C. at a rate of 20° C./minute while data was being collected. The Tg was measured at the midpoint of the inflection using the half-height method.

"Latex binder" means "Dispersed polymer", "Solubilized polymer" (both defined below), or a mixture thereof.

"Dispersed polymer" means a colloidal dispersion of polymer particles in an aqueous carrier.

"Solubilized polymer" includes "Water soluble polymer", "Water reducible polymer" or a mixture thereof. Water soluble polymer means a polymer dissolved in water. Water reducible polymer means a polymer dissolved in water and water miscible solvent. Solubilized polymer results in a polymer solution characterized by having the self-crowding constant (K) of the Mooney equation $[1/\ln \eta_{rel} = 1/BC - K/2.5]$ equal to zero. By contrast, dispersed polymer has (K) equal to 1.9. The details of Mooney equation are disclosed in an article entitled *"Physical Characterization of Water Dispersed and Soluble Acrylic Polymers"* by Brendley et al., in "Nonpolluting Coatings and Coating Processes" published by Plenum Press, 1973 and edited by Gordon and Prane.

"Polymer particle size" means the diameter of the polymer particles measured by using a Brookhaven Model BI-90 Particle Sizer supplied by Brookhaven Instruments Corporation, Holtsville, N.Y., which employs a quasi-elastic light scattering technique to measure the size of the polymer particles. The intensity of the scattering is a function of particle size. The diameter based on an intensity weighted average is used. This technique is described in Chapter 3, pages 48–61, entitled *Uses and Abuses of Photon Correlation Spectroscopy in Particle Sizing* by Weiner et al. in 1987 edition of American Chemical Society Symposium series. To measure the particle diameter, 0.1 to 0.2 grams of a sample of acrylic polymer was diluted to a total of 40 milliliters (mLs) with distilled water. A two mLs portion was delivered into an acrylic cell, which was then capped. The particle size in nanometers was measured for 1000 cycles. The measurement was repeated three times and an average was reported.

"Latex binder solids" means the latex binder in its dry state.

"No-pick-up time" means the time it takes for the layer of wet traffic paint composition to dry out sufficiently to such extent that no paint adheres to a free roll of the rubber test wheels decribed in ASTM test D 711-89 entitled "Standard Test for No-Pick-Up Time of Traffic Paint".

The first step of the method of the preferred embodiment of the present invention is directed to applying on a road surface a layer of a waterborne traffic paint composition. The layer of the coating composition may be applied by the methods known in the art, such as, for example, by spraying the composition on the road surface by means, such as, truck mounted spray guns where the paint composition is supplied from an air pressurized tank or by means of an airless pump. If desired, the traffic paint composition may be hand applied by means of a paint brush or a paint roller. It is contemplated that the road surface on which the layer of the waterborne traffic paint composition is applied is preferably cleaned by removing any dirt or sediments prior to the application of the waterborne traffic paint composition. The thickness of the layer of the waterborne traffic paint composition generally varies from 300 micrometers to 3000 micrometers, preferably from 350 micrometers to 1000 micrometers.

The second step of the method of the present invention is drying the layer for forming the wear resistant coating, such as, traffic marking, having improved wear resistance. During the drying step, an aqueous evaporable carrier contained within the coating composition is evaporated from the layer applied to the road surface. The rate of evaporation of the aqueous evaporable carrier is dependent upon the ambient conditions to which the layer of the traffic paint composition is exposed to and also upon the thickness of the layer applied to the road surface, which typically varies in the range of from 300 micrometers to 2000 micrometers, preferably in the range of from 350 micrometers to 1000 micrometers. It is to be noted that, higher the atmospheric humidity, longer will be the no-pick-up time for layer of the present composition, as evaluated under ASTM D 711 - 89. For example. when the relative humidity is in the range of 65 percent to 90 percent, the no-pick-up time for the layer of the present composition varies in the range of from 1 minute to 60 minutes, preferably in the range of from 1 minute to 20 minutes and most preferably in the range of from 1 minute to 10 minutes from the application of the layer.

The traffic paint composition suitable for use in the method of the present invention preferably includes an anionically stabilized latex binder having a Tg in the range varying from 0° C. to 60° C., preferably from 10° C. to 40° C., and a low GPC number average molecular weight. The applicants have unexpectedly discovered that by utilizing latex binders having low GPC number average molecular weight in the traffic paint composition, its wear resistance is improved over those traffic compositions having latex binders with high GPC number average molecular weight. The low GPC number average molecular weight is in the range varying from 1000 to less than 30,000, more preferably varying from 10,000 to 20,000.

The latex binder of the composition may be a dispersed polymer having polymer particles dispersed in an aqueous evaporable carrier or it may either be a water soluble polymer, a water-reducible polymer, a mixture of the water soluble and water-reducible polymers in the aqueous evaporable carrier, or a mixture of the dispersed, water-reducible and water soluble polymers in the aqueous evaporable carrier. If desired the latex binder may include a mixture of a dispersed polymer with a water soluble or a water-reducible polymer. The latex binder in the form of a dispersed polymer particles is preferred, wherein the particle size of the dispersed polymer particles varies in the range of from 20 to 1000 nanometers, preferably in the range of from 30 to 300 nanometers, more preferably in the range of from 100 to 250 nanometers. The aqueous evaporable carrier includes water or water having dissolved therein a water miscible organic solvent, such as, methanol, ethanol and glycol ethers. Water is preferred.

The latex binder is polymerized from at least one or more of the following monomers, such as, for example, acrylic and methacrylic ester monomers including methyl (meth) acrylate, ethyl (meth)acrylate, butyl (meth)acrylate, 2-ethylhexyl (meth)acrylate, decyl (meth)acrylate, lauryl (meth)acrylate, isobornyl (meth)acrylate, isodecyl (meth) acrylate, oleyl (meth)acrylate, palmityl (meth)acrylate, stearyl (meth)acrylate, hydroxyethyl (meth)acrylate, and hydroxypropyl (meth)acrylate; acid functional monomers, such as, acrylic acid, methacrylic acid, crotonic acid, itaconic acid, fumaric acid and maleic acid; monomethyl itaconate; monomethyl fumarate; monobutyl fumarate; maleic anhydride; acrylamide or substituted acrylamides; sodium vinyl sulfonate; phosphoethyl(meth)acrylate; acrylamido propane sulfonate; diacetone acrylamide; glycidyl methacrylate; acetoacetyl ethylmethacrylate; acrolein and methacrolein; dicyclopentadienyl methacrylate; dimethyl meta-isopropenyl benzyl isocyanate; isocyanato ethylmethacrylate; styrene or substituted styrenes; butadiene; ethylene; vinyl acetate or other vinyl esters; vinyl monomers, such as, for example, vinyl halide, preferably vinyl chloride, vinylidene halide, preferably vinylidene chloride, N-vinyl pyrrolidone; amino monomers, such as, for example, N,N'-dimethylamino (meth)acrylate and acrylonitrile or methacrylonitrile.

If desired, at least one of the monomers utilized in the preparation of the latex binder, may be an acid or amino functional monomer or a combination of an acid, or amino functional monomers.

The latex binders polymerized from the following monomeric mixtures are more preferred:

1) butyl acrylate and methyl methacrylate,
2) butyl acrylate and styrene,
3) 2-ethyl hexyl acrylate with methyl methacrylate, or
4) 2-ethyl hexyl acrylate with styrene.

Preferably the monomeric mixture further includes an acrylic or methacrylic add monomer or a mixture thereof.

The latex binder used in this invention is a substantially thermoplastic or substantially uncrosslinked copolymer when applied to the substrate. If desired, premature crosslinking or gelling of the copolymer is induced by adding to the monomer mix multi-ethylenically unsaturated monomers in the range of 0.1% to 25%, by weight based on the weight of the copolymer. Typical multi-ethylenically unsaturated monomers include allyl methacrylate, diallyl phthalate, 1,4-butylene glycol dimethacrylate, 1,6-hexanedioldiacrylate and divinyl benzene. It is important, however, that the quality of the film formation is not materially impaired.

The polymerization techniques used for preparing the anionically stabilized latex binders of the present invention are well known in the art. The latex binder may be prepared by aqueous solution polymerization or by emulsion polymerization. Emulsion polymerization is preferred. Either thermal or redox initiation processes may be used. Polymers and copolymers of alpha-beta ethylenically unsaturated monomers and their esters, especially the acrylic and methacrylic esters, are preferably prepared by processes given in "Emulsion Polymerization of Acrylic Monomers: May, 1966" published by the Rohm and Haas Company, Philadelphia, Pa.

The polymerization process is typically initiated by conventional free radical initiators, such as, for example, hydrogen peroxide, benzoyl peroxide, t-butyl hydroperoxide, t-butyl peroctoate, ammonium and alkali persulfates, typically at a level of 0.05 percent to 3.0 percent by weight, all weight percentages based on the weight of total monomer. Redox systems using the same initiators coupled with a suitable reductant such as, for example, sodium bisulfite may be used at similar levels.

Chain transfer agents may be used in an amount effective to provide the desired GPC number average molecular weight. For purposes of regulating molecular weight of the latex binder being formed, suitable chain transfer agents include well known halo-organic compounds such as carbon tetrabromide and dibromodichloromethane; sulfur-containing compounds such as alkylthiols including ethanethiol, butanethiol, tert-butyl and ethyl mercaptoacetate, as well as aromatic thiols; or various other organic compounds having hydrogen atoms which are readily abstracted by free radicals during polymerization. Additional suitable chain transfer agents or ingredients include but are not limited to butyl mercaptopropionate; isooctyl mercaptopropionic acid; isooctylmercapto propionate ("IOMP"); bromoform; bromotrichloromethane ("BTCM"); carbon tetrachloride; alkyl mercaptans, such as, 1-dodecanthiol, tertiary-dodecyl mercaptan, octyl mercaptan, tetradecyl mercaptan, and hexadecyl mercaptan; alkyl thioglycolates, such as, butyl thioglycolate, isooctyl thioglycoate, and dodecyl thioglycolate; thioesters; or combinations thereof. Mercaptans are preferred.

When the latex binder in the form of a dispersed polymer is utilized, the polymer particle size is controlled by the amount of conventional surfactants added during the emulsion polymerization process. Conventional surfactants include anionic, nonionic emulsifiers or their combination. Typical anionic emulsifiers include the salts of fatty rosin and naphthenic acids, condensation products of napthalene sulfonic acid and formaldehyde of low molecular weight, carboxylic polymers and copolymers of the appropriate hydrophile-lipophile balance, alkali or ammonium alkyl sulfates, alkyl sulfonic acids, alkyl phosphonic acids, fatty acids, and oxyethylated alkyl phenol sulfates and phosphates. Typical nonionic emulsifiers include alkylphenol ethoxylates, polyoxyethylenated alkyl alcohols, amine polyglycol condensates, modified polyethoxy adducts, long chain carboxylic acid esters, modified terminated alkylaryl ether, and alkylpolyether alcohols. Typical ranges for surfactants are between 0.1 to 6 percent by weight based on total weight of total monomer.

Alternatively, the latex binder may include multi-stage polymer particles having two or more phases of various geometric structures, such as, for example, core/shell or core/sheath particles, core/shell particles with shell phases incompletely encapsulating the core, core/shell particles with a multiplicity of cores and interpenetrating network particles. In all of these cases, the majority of the surface area of the particle will be occupied by at least one outer phase and the interior of the latex polymer particle will be occupied by at least one inner phase. The outer phase of the multi-stage polymer particles weighs 5 weight percent to 95 weight percent based on the total weight of the particle. It is often desirable for each stage of the multi-stage polymer particles to have a different Tg. If desired, each stage of these multi-stage polymer particles may be provided with different GPC number average molecular weight, such as, the multi-stage polymer particle composition disclosed in U.S. Pat. No. 4,916,171.

The multi-stage polymer particles are prepared by conventional emulsion polymerization process in which at least two stages differing in composition are formed in a sequential fashion. Such a process usually results in the formation of at least two polymer compositions. Under certain circumstances it may be advantageous to have one of the polymer compositions be soluble in water or under aqueous alkaline conditions (pH>7). Each of the stages of the multi-stage polymer particles may contain the same monomers, chain transfer agents, surfactants, as those disclosed earlier for the polymer particles. The emulsion polymerization techniques used for preparing such multi-stage polymer particles are well known in the art and are disclosed, for example, in the U.S. Pat. Nos. 4,325,856, 4,654,397 and 4,814,373.

The latex binder in the form of the water-reducible polymer or water-soluble polymer may be prepared directly in water if the monomer mix is water-soluble or, as is most often the case, the polymerization solvent is a water-miscible solvent, such as, isopropanol, butyl cellosolve, propylene glycol. In such a case, water may be included in the polymerization mixture or post added after the polymerization is complete. Such polymers may be prepared by utilizing the monomers described earlier. Another route to the preparation of a water-soluble polymer for this invention is to prepare a latex polymer having enough acrylic or methacrylic acid or other polymerizable add monomer (usually greater than 10 percent) such that the latex polymer can be solubilized by the addition of ammonia or other base. Water-soluble polymers of this type are advantageously used as blends with the dispersed polymers.

If desired, the latex binder may further be provided with an enamine functional pendant moiety, which results from the reaction of an acetoacetyl functional pendant moiety on the backbone of the latex polymer with an excess of stoichiometric amount of ammonia or primary amine added to the aqueous evaporable carrier of the waterborne traffic paint composition. Generally, the pH of the aqueous evaporable carrier of the waterborne traffic paint composition is maintained in the range varying from 7.5 to 11, preferably from 9.5 to 10.5 to provide the latex binder with the enamine functional pendant moiety.

The latex binder may be polymerized from a monomeric mix containing from 0.5 percent to 100 percent, preferably from 5 percent to 20 percent, and most preferably, from 8 percent to 15 percent, of one or more acetoacetyl functional monomers, all percentages being in weight percentages based on the total weight of the latex binder solids. These acetoacetyl functional monomers have the following structures:

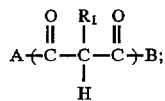

wherein A is either:

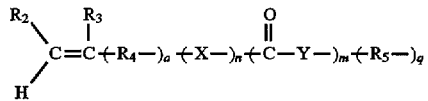

or

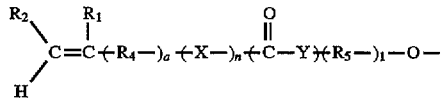

wherein $R_1$ is either H, alkyl having 1 to 10 carbon atoms or phenyl;

$R_2$ is either H, alkyl having 1 to 10 carbon atoms or phenyl, halo, $CO_2CH_3$, or CN;

wherein $R_3$ is either H, alkyl having 1 to 10 carbon atoms or phenyl or halo;

wherein $R_4$ is either alkylene having 1 to 10 carbon atoms or phenylene;

wherein $R_5$ is either alkylene having 1 to 10 carbon atoms or phenylene;

wherein a, m, n, and q is either 0 or 1;

wherein each of X and Y is either —NH— or —O—; and wherein

B is either A, alkyl having 1 to 10 carbon atoms or phenyl or heterocyclic.

Preferably ethylenically-unsaturated acetoacetyl monomers include, among the following, various acetoacetamides, including but not limited to:

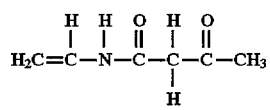

and

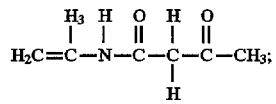

acetoacetoxyethyl methacrylate ("AAEM"); acetoacetoxyethyl acrylate ("AAEA"); allyl acetoacetate; vinyl acetoacetate; or combinations thereof.

AAEM is structurally represented as:

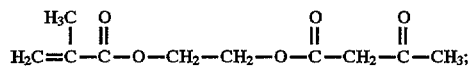

AAEA is structurally represented as:

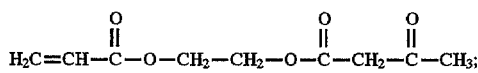

allyl acetoacetate is structurally represented as:

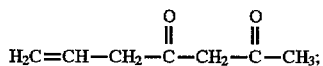

and vinyl acetoacetate is structurally represented as:

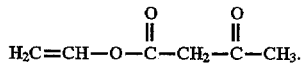

Particularly preferred ethylenically-unsaturated acetoacetyl monomer includes acetoacetoxyethyl methacrylate, acetoacetoxyethyl acrylate, acetoacetoxypropyl methacrylate, allyl acetoacetate, acetoacetoxybutyl methacrylate, 2,3-di(acetoacetoxy)propyl methacrylate, or combinations thereof.

If desired, the latex binder having the enamine functional pendant moieties of the present invention may be modified by adding an effective amount of an aminosilane. The quantity of aminosilane added to the reaction mixture is a function of the acetoacetyl functionality content of the latex binder. As stated earlier, the level of acetoacetyl functional monomer is generally from about 0.5 weight percent to about 100 weight percent, based on the weight of the polymer. The level of aminosilane to modify the binder is from 0.1 to 2.0 moles of amine moiety to one mole of acetoacetyl group, preferably from 0.1 to 1.0, more preferably from 0.25 to 0.75

If insufficient aminosilane is used in relation to the acetoacetyl functional latex binder, properties, such as, for example, wear resistance, water sensitivity, drying speed of the resultant traffic marking may be compromised. Whereas, on the other hand, if the ratio of the moles of aminosilane to the moles of acetoacetyl functionality is much greater than 2, the coating properties, such as, film formation may be affected due to, it is believed, excessive crosslinking of the silane groups, which results in increased water sensitivity.

Aminosilanes of various molecular weights and structures may be used to modify the latex binder having the acetoacetyl functional pendant moeities in practicing the present invention. The general structure of the aminosilanes useful for the invention is:

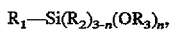

where n is greater than or equal to 1 but less than or equal to 3, $R_1$ is an alkyl or phenyl group or combinations thereof and contains at least one amine group capable of forming an enamine with the acetoacetyl functional pendant moeity, $R_3$ is alkyl, phenyl or hydrogen atom or combinations thereof, and $R_2$ is a hydrogen atom, phenyl or alkyl group or combinations thereof.

The group $R_2$ may also be oligomers of silane, which may or may not contain $OR_3$ groups and which may or may not include amine functionality capable of undergoing enamine formation with acetoacetyl groups. Practical considerations, such as, solubility, hydrolysis rate, compatibility with the acetoacetate precursor polymer, polymer stability, are some of the few limitations placed upon the structure and molecular weight of the aminosilane. Preferably, n is equal to 1 or 2, $R_2$ is a methyloxy or ethyloxy group and that $R_1$ is an alkyl group of 3 to 6 carbon atoms and contains no more than one amine group capable of forming an enamine with the acetoacetyl group.

Some of the aminosilanes found to be effective modifiers of the latex binders having the enamine functional pendant moieties may be selected from the group consisting of N-methylaminopropyltrimethoxysilane aminoethylaminopropylmethyldimethoxysilane, aminoethylaminopropyltrimethoxysilane, aminopropylmethyldimethoxysilane, aminopropyltrimethoxysilane, polymeric aminoalkylsilicone, aminoethylaminoethylaminopropyltrimethoxysilane, N-methylaminopropyltrimethoxysilane, aminopropylmethyldimethoxysilane, aminopropyltriethoxysilane, 4-aminobutyltriethoxysilane, oligomeric aminoalkylsilane, and various combinations thereof. These aininosilanes are available from Dow Corning, Midland, Mich., Union Carbide-Specialty Chemicals Division, Danbury, Conn. and Hulls of America, Piscataway, N.J., Wacker Silicones Corporation, Adrian, Mich. Aminoethylaminopropyltrimethoxysilane, sold under the tradename Dow Corning Z-6020 is preferred.

The latex binder is preferably provided with an acid functional pendant moiety sufficient to provide the latex binder with an acid number in the range of from 0.1 to 390, preferably in the range of from 0.8 to 390, more preferably in the range of from 2 to 100 and most in the range of from 6 to 50. The desired acid number is achieved by controlling the amount of acid functional monomer utilized in producing the latex binder. The desired range of the acid number is obtained by utilizing the latex binder containing an acid functional monomer, such as, phosphoethyl methacrylate monomer or ethylenically-unsaturated carboxylic add monomers, such as, acrylic acid, fumaric acid-monoethyl ester, fumaric acid, itaconic acid, maleic acid, maleic anhydride, methacrylic acid, fumaric acid-monomethyl ester, methyl hydrogen maleate, 2-acrylamido-2-methylpropane sulfonic acid, sodium vinyl sulfonate, sulfoethyl methacrylate, or various combinations thereof. Ethylenically-unsaturated carboxylic acid monomer is preferred. More preferred ethylenically unsaturated carboxylic acid monomer is selected from the group consisting of acrylic acid, methacrylic acid, and various combinations thereof.

If desired, the composition suitable for the method of the present invention includes an amine modified latex binder, or a blend of the latex binder with a polyfunctional amine or a combination, preferably in equal proportions, of the blend and the amine modified latex binder. The blend includes from 0 to 20 percent, preferably 0.5 to 10, and more preferably 2 to 5 percent, of the polyfunctional amine, all in weight percentages based on the total weight of the blend solids.

Essentially all of the polyfunctional amine or the amine modified latex binder suitable for blending with the latex binder is maintained in a deprotonated state by raising the pH of the aqueous evaporable carrier of the latex binder to the range of from 7.5 to 11, preferably from 9.5 to 10.5. This means essentially all of the amine functional groups in the polyfunctional amine or in the amine modified latex binder are in a deprotonated state. The pH of the aqueous evaporable carrier is raised by adding a base, such as, ammonia; alkali metal hydroxide, such as, sodium hydroxide; morpholine and the lower alkyl amines, such as, 2-methylaminoethanol, 2-dimethylaminoethanol, N-methylmorpholine and ethylenediamine. Volatile bases, such as, ammonia, or a mixture of volatile bases and nonvolatile bases, such as, sodium hydroxide, are preferred. Ammonia in particular is most preferred. As a result of deprotonation of the amine functional groups in the polyfunctional amine, essentially all of amine functional groups are uncharged, i.e., neutralized, thus preserving colloidal stability of the latex binder.

The polyfunctional amine is polymerized from 20 percent to 100 percent, preferably from 50 percent to 100 percent, all in weight percentages based on the total weight of the polyfunctional amine solids of at least one or more classes of the amine containing monomers disclosed below:

Class 1. Aminoalkyl vinyl ethers, wherein alkyl groups may be straight- or branched-chains having two to three carbon atoms and wherein nitrogen atom may be a primary, secondary, or tertiary nitrogen atom. Such a process is disclosed in the U.S. Pat. No. 2,879,178. When the monomer containing a tertiary nitrogen atom is utilized, one of the remaining hydrogen atoms may be substituted by alkyl, hydroxyalkyl, or alkoxyalkyl groups, the alkyl components of which may have one to four carbon atoms, preferably one carbon atom. Specific examples include: beta-aminoethyl vinyl ether; beta-aminoethyl vinyl sulfide; N-monomethyl-beta-aminoethyl vinyl ether or sulfide; N-monoethyl-beta-aminoethyl vinyl ether or sulfide; N-monobutyl-beta-aminoethyl vinyl ether or sulfide; and N-monomethyl-3-aminopropyl vinyl ether or sulfide.

Class 2. Acrylamide or acrylic esters, such as, those of the formula II:

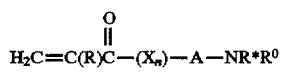

wherein

R is H or $CH_3$;

n is 0 or 1;

X is O or N(H).

When n is zero, A is $O(CH_2)_x$, wherein x is 2 to 3, or (O-alkylene)$_y$; wherein (O-alkylene)$_y$ is a poly(oxyalkylene) group, having a GPC number average molecular weight in the range from 88 to 348, in which the individual alkylene radicals are the same or different and are either ethylene or propylene; and when n is 1, A is an alkylene group having 2 to 4 carbon atoms;

R* is H, methyl, or ethyl; and

R° is H, phenyl, benzyl, methylbenzyl, cyclohexyl, or $(C_1-C_6)$ alkyl.

Some of the preferred examples of compounds of formula II include:

dimethylaminoethyl acrylate or methacrylate; beta-aminoethyl acrylate or methacrylate; N-beta-aminoethyl acrylamide or methacrylamide; N-(monomethylaminoethyl)-acrylamide or methacrylamide; N-(mono-n-butyl)-4-aminobutyl acrylate or methacrylate; methacryloxyethoxy-ethylamine; and acryloxypropoxypropoxypropylamine.

Class 3. N-acryloxyalkyl-oxazolidines and N-acryloxyalkyltetrahydro-1,3-oxazines and the corresponding components in which the "alkyl" linkage is replaced by alkoxyalkyl and poly(alkoxy-alkyl), all of which are embraced by Formula III:

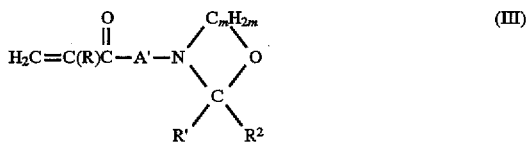

wherein

R is H or $CH_3$;

m is an integer having a value of 2 to 3;

R', when not directly joined to $R^2$, is selected from the group consisting of hydrogen, phenyl, benzyl, and $(C_1-C_{12})$ alkyl groups;

$R^2$, when not directly joined to R', is selected from the group consisting of hydrogen and $(C_1-C_4)$ alkyl groups;

$R^1$ and $R^2$, when directly joined together, form a 5- to 6-carbon ring with the attached carbon atom of the ring in the formula, i.e., $R^1$ and $R^2$, when joined together, are selected from the group consisting of pentamethylene and tetramethylene; and $A^1$ is $O(C_mH_{2m})$— or (O-alkylene)n in which (O-alkylene)$_n$ is a poly(oxyalkylene) group, having a GPC number average molecular weight in the range from 88 to 348 and in which the individual alkylene radicals are the same or different and are either ethylene or propylene.

The compounds of Formula III can hydrolyze under various conditions to secondary amines. The hydrolysis produces products having the Formula IV:

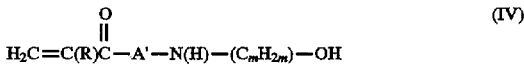

The compounds of Formula III are disclosed in U.S. Pat. Nos. 3,037,006 and 3,502,627.

Some of the preferred examples of compounds of Formula III include:

oxazolidinylethyl methacrylate; oxazolidinylethyl acrylate; 3-(gamma-methacryl-oxypropyl)-tetrahydro-1,3-oxazine; 3-(beta-methacryloxyethyl)-2,2-penta-methylene-oxazolidine; 3-(beta-methacryloxyethyl-2-methyl-2-propyloxazolidine; N-2-(2-acryloxyethoxy)ethyl-oxazolidine; N-2-(2-methacryloxyethoxy)ethyl-oxazolidine; N-2-(2-methacryloxyethoxy)ethyl-5-methyl-oxazolidine; N-2-(2-acryloxyethoxy)ethyl-5-methyl-oxazolidine; 3-[2-(2-methacryloxyethoxy)ethyl)]-2,2-pentamethylene-oxazolidine; 3-[2-(2-methacryloxyethoxy)ethyl)]-2,2-dimethyloxazolidine; 3-[2-(methacryloxyethoxy)ethyl]-2-phenyl-oxazolidine; 2-isopropenyl-2-oxazoline.

Class 4. Polymers of monomers which readily generate amines by hydrolysis are also useful in the preparation of the polyfunctional amine. Examples of such monomers are acryloxy-ketimines and acryloxy-aldimines, such as, those of the Formulas V and VI shown below:

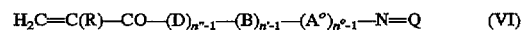

wherein

R is H or $CH_3$;

Q is selected from the group consisting of $$=C\begin{matrix}R^4\\ \\ R^5,\end{matrix} \quad =C\boldsymbol{(}CHR^6\boldsymbol{)}_x\boxed{\phantom{xxx}}, \quad \text{and} \quad =CHR^3;$$

$R^6$ is H or it may be methyl in one $CHR_6$ unit;

$R^5$ is selected from the group consisting of $(C_1-C_{12})$-alkyl and cyclohexyl groups;

$R^4$ is selected from the group consisting of $(C_1-C_{12})$-alkyl and cyclohexyl $R^3$ is selected from the group consisting of phenyl, halophenyl, $(C_1-C_{12})$-alkyl, cyclohexyl, and $(C_1-C_4)$ alkoxyphenyl groups;

A" is an alkylene group $(C_1-C_{12})$;

$A^o$, B and D are the same or different oxyalkylene groups having the formula —OCH($R^7$)—CH($R^7$)— wherein $R^7$ is H, $CH_3$, or $C_2H_5$;

x is an integer having a value of 4 to 5;

$n^o$ is an integer having a value of 1 to 200;

n' is an integer having a value of 1 to 200; and n" is an integer having a value of 1 to 200, the sum of $n^o$-1, n'-1 and n"-1 having a value of 2 to 200.

Some of the preferred examples of compounds of Formula V and VI include:

2-[4-(2,6-dimethylheptylidene)-amino]-ethyl methacrylate;

3-[2-(4-methylpentylidine)-amino]-propyl methacrylate;

beta-(benzylideneamino)-ethyl methacrylate;

3-[2-(4-methylpeneylidene)-amino]-ethyl methacrylate;

2-[4-(2,6-dimethylheptylidene)-amino]-ethyl acrylate;

12-(cyclopentylidene-amino)-dodecyl methacrylate;

N-(1,3-dimethylbutylidene)-2-(2-methacryloxyethoxy)-ethylamine;

N-(benzylidene)-methacryloxyethoxyethylamine;

N-(1,3-dimethylbutylidene)-2-(2-acryloxyethoxy)-ethylamine; and

N-(benzylidene)-2-(2-acryloxyethoxy)ethylamine.

The compounds of Formulas V and VI hydrolyze in acid, neutral, or alkaline aqueous media to produce the corresponding primary amines or salts thereof in which the group —N=Q of the formulas becomes —$NH_2$ and O=Q. The compounds of Formulas V and VI are disclosed in U.S. Pat. Nos. 3,037,969 and 3,497,485 and any of the monomeric compounds therein disclosed may be used in the making of the copolymers to be used in water-soluble polymer portion of the compositions of the present invention.

Class 5. Any non-polymeric polyfunctional amine having at least 2 primary or secondary amino groups can be employed. Such amines include aliphatic and cycloaliphatic amines each having 2 to 10 primary or secondary amino groups and 2 to 100 carbon atoms. Preferred non-polymeric polyfunctional amines include 2 to 4 primary amino groups and 2 to 20 carbon atoms. Still further in this regard, suitable non-polymeric polyfunctional amines include, but not limited to, hexamethylene diamine; 2-methyl pentamethylene diamine; 1,3-diamino propane; 1,3-diamino pentane; dodecane diamine; 1,2-diamino cyclohexane; 1,4-diamino cyclohexane; para-phenylene diamine; 3-methyl piperidine; piperazine; N-amino ethylpiperazine; isophorone diamine; bis-hexamethylene triamine; diethylene triamine; ethylene diamine; diethylamine triamine; triethylene tetramine; tris (2-aminoethyl) amine; ethylene oxide-amine; polyoxyalkylene amines, such as, Jeffamine® D, ED and T series polyoxypropylene amine, supplied by Texaco Chemical Company of Houston, Tex.; amine-functional acrylic resins, disclosed in U.S. Pat. No. 4,120,839; trimethyl hexamethylene diamine; and tetraethylene pentamine. Mixtures of these non-polymeric polyfunctional amine can also be used. The most preferred non-polymeric polyfunctional amine is a polyoxypropylene amine having the formula:

$$H_2NCH-CH_2+OCH2-CH\overline{\underset{2.6}{\phantom{x}}}NH_2$$
with $CH_2$ / $CH_2$ side groups which is supplied under the trademark Jeffamine® D-230 polyoxypropylene amine by Texaco Chemical Company, Houston, Tex.

In general, the polyfunctional amines may be obtained by solution polymerization in aqueous media, either neutral, alkaline, or acidic, depending upon the particular polymer sought, for example, as taught in U.S. Pat. No. 4,119,600. The polyfunctional amines include copolymers with up to 80 percent by weight of one or more monoethylenically unsaturated monomers, such as, methyl acrylate, acrylamide and methacrylamide. Small amounts of relatively insoluble comonomers may also be used to obtain the water-soluble polyfunctional amines. The insoluble polymers may contain larger amounts of these comonomers. Such monomers include, for example, acrylic add esters with (C1 to C18) alcohols and methacrylic acid esters with alcohols having one to 18 carbon atoms, especially (C1–C4) alkanols; styrene, vinyltoluene, vinyl acetate, vinyl chloride, vinylidene chloride, substituted styrenes, butadiene, substituted butadienes, ethylene; and the nitriles and amides of acrylic or of methacrylic acid. The particular comonomer or comonomers used in making the polyfunctional amines, depends upon the proportion of amine-containing monomer used in making the copolymer.

Alternatively, the same polymer back bone of the latex binder may be provided with both the acid functional moiety and the amine functional moiety, accomplished by a two stage polymerization process in which one stage contains the acid functional moiety, and the other stage contains the amine functional moiety. A process for preparing such binders is disclosed in U.S. Pat. No. 4,760,110.

The latex binder contains from 30 percent to 70 percent, preferably from 35 to 65 percent of the blend in the aqueous evaporable carrier when the latex binder is the dispersion of polymer particles, and from 25 to 50 percent, preferably from 30 to 40 percent of the blend in the aqueous evaporable carrier when a latex polymer is the solubilized polymer, all in weight percentages based on the total weight of the latex binder.

If desired and depending on the intended use of the traffic paint composition, additional components may be added to the composition. These additional components include but are not limited to thickeners; theology modifiers; dyes; sequestering agents; biocides; dispersants; pigments, such as, titanium dioxide, organic pigments, carbon black; extenders, such as, calcium carbonate, talc, clays, silicas and silicates; fillers, such as, glass or polymeric microspheres, quartz and sand; anti-freeze agents; plasticizers; adhesion promoters; coalescents; wetting agents; waxes; surfactants; slip additives; crosslinking agents; defoamers; colorants;

preservatives; freeze/thaw protectors, corrosion inhibitors; alkali or water soluble polymers.

If desired, the method of the present invention may include dropping glass beads on the layer of the traffic paint composition of the present invention before the layer is dry to ensure the adhesion of the glass beads to the layer applied to the road surface. Facially disposed glass beads on the traffic markings act as light reflectors. If glass beads are not used, the traffic markings would be difficult to see under night and wet weather conditions. Thus, almost all of the traffic markings are beaded, i.e., glass beads sprinkled and affixed on top of the coatings roughly at the rate of 0.72 to 2.9 kilograms or more per liter of paint for night and wet weather visibility. The glass beads are dropped by methods known in the art, such as, by spraying the glass beads entrained and conveyed by a jet of air and dropped atop the layer or by sprinkling the glass beads at a desired rate from a storage hopper positioned above the layer of the traffic paint composition of the present invention. The glass beads are applied over the layer, while the layer is still in its "wet" state, i.e., before the layer dries up to form the traffic paint marking. The amount of glass beads dropped on the layer is dependent upon the size, refractive index, and surface treatment of the glass beads. The typical glass beads specified for traffic markings are described under AASHTO Designation M 247-81 (1993) developed by American Association of State Highway and Transportation Officials, Washington, D.C. Optionally, glass beads may be premixed with the traffic paint composition before it is applied to road surfaces. The traffic paint composition used in the method of the present invention not only provides improved wear resistance over the alkyd-based traffic paints, but it also provides improved bead retention, which commonly refers to the degree of retention provided by the traffic paint binder to the facially disposed glass beads.

If desired, the no-pick-up time for the layer of the traffic paint composition of the present invention may be further improved by contacting the layer with a coagulant, which includes, weak acids, such as, aqueous acetic or citric acid, at a strength in range of from 10 percent to 30 percent, more preferably at 20 percent. Alternatively, stronger acids, such as, hydrochloric or sulfuric acids, diluted to a strength in the range of 5 to 15 percent, preferably 10 percent. Citric acid is preferred. The coagulant may be applied by any one of the conventional methods known in the art, such as, for example, by spraying the coagulant on the layer. It is believed without reliance thereon, that the coagulant when contacted with the layer coagulates the latex binder present in the layer to improve the drying rate of the layer. The amount of the coagulant sprayed on the layer depends upon the amount of the latex binder present in the layer and also upon the type of the latex binder used in the traffic paint composition. The amount in weight percent of the coagulant sprayed on the layer of the coating composition depends upon the type of acid, its strength and the type of spraying equipment used in carrying out the coagulation step. The coagulant, such as, citric acid at 20 percent strength, applied at the rate in the range of 0.6 percent to 2 percent, preferably at 1 percent, all in weight percentages, based on the total weight of the coating composition applied as a layer is suitable.

In another embodiment of the method of the present invention utilizes a traffic paint composition containing a latex binder having a GPC number average molecular weight varying from 1,000 to 1,000,000, preferably from more than 30,000 to 700,000 (the high GPC number average molecular weight polymer), and most preferably from 100,000 to 250,000. The latex binder prepared in accordance with the process described earlier is provided with an enamine functional pendant moiety and is modified with an aminosilane by the methods described earlier.

If desired, the latex binder suitable for the method of this embodiment may be further provided with an acid functional pendant moiety by the method described earlier. It may also, as described earlier, be blended with a polyfunctional amine maintained in a deprotonated state by raising the pH of the aqueous evaporable carrier of the latex binder and if further desired, the no-pick-up time for the layer of this traffic paint composition may be further improved by contacting the layer with a coagulant by the process described earlier. Except for the GPC number average molecular weight, same components in same proportions may be used in preparing the traffic paint composition suitable for the method of this embodiment as that described earlier.

TEST PROCEDURES

The following test procedures were used for generating the data reported in the Examples below:

1. The Wear Resistance Test

The wear resistance of the traffic paint markings produced in accordance with the method of the present invention was evaluated under ASTM D 913-88 entitled Standard Test Method for Evaluating Degree of Resistance to Wear of the Traffic Paint. The traffic markings, also known as, test tracks, were prepared and applied in accordance with ASTM D 713-90. The glass beads used on test markings were in conformance to AASHTO Designation M 247-81 (1993) published by American Association of State Highway and Transportation Officials, Washington, D.C.

380 micrometers thick layers of the white traffic paint composition of Examples, described below, were spray applied transversely to the direction of traffic flow, i.e., perpendicular to the flow of traffic, over a Portland cement road by means of a walk behind, self-propelled striping machine, supplied by Linear Dynamics, Inc., Parsippany, N.J. The reason for applying the test tracks in a direction transverse to the traffic flow was to accelerate the degradation of test tracks by increasing the number of vehicle passes over the test tracks, particularly where the vehicle tires pass most frequently, which is defined as "wheel track area". Glass beads, sold under the name Highway Safety Spheres with Adherence Coating AC-07™ supplied by Potters Industries, Inc., Carlstadt, N.J. were dropped on the layer of the white traffic paint composition. The wear resistance of the test tracks to the road surface was observed 106 days after their application to the road surface.

2. No-Pick-up Time Test

A 500 micrometer thick layer of the pot mix of the pigmented version of coating composition, described below, was applied over 10 cms×30 cms glass test panels, by the method described below. The thickness of the layer was controlled in such a way that the resultant (after drying) traffic marking thereon would have a film thickness varying from 200 to 275 micrometers. The no pick-up time of the layer was determined in accordance with ASTM #D711, by rolling a traffic paint drying time wheel over the wet layer. The end point for no pick-up time is defined as the point in time where no paint adheres to the rubber rings of the test wheel 3. Dry-Through Time The pigmented versions of the traffic paint compositions were applied over 10 cms×30 cms glass test panels to form the layer of the traffic paint composition thereon. The thickness of the layer was controlled in such a way that the resultant (after drying) traffic marking thereon would have a film thickness varying from 175 to 200 micrometers. The test panels were then promptly placed in a test chamber supplied by Victor Associates, Inc., Hatboro, Pa. and maintained at a relative humidity of 90 percent ±3 percent. The test chamber was equipped with a certified hygrometer and a certified temperature indicator, both of which were fastened to the center of the rear wall of the test chamber to ensure balanced measurement. The relative humidity of 90 percent ±3 percent prior to positioning of the test panels inside the test chamber was achieved by filling the pan at the bottom of the test chamber with 2 cms of water and then closing all the ports and doors and then allowing the test chamber to equilibrate overnight. After overnight equilibration, the relative humidity within the test chamber reached 100 percent. By carefully opening and closing the various ports, the relative humidity within the chamber was brought to 90 percent ±3 percent.

The doors of the test chamber were opened briefly at 15 minute intervals to evaluate the dry-through time for the layer of the traffic paint composition. The dry-through time is defined as the time it takes for the layer from its application to the panel until the time the layer is dry enough to be not distorted from a 90 degree thumb twist applied with no pressure on the layer.

EXAMPLE 1

The latex polymer of the polymeric binder component of the coating composition was prepared in the following manner:

To 825 g of deionized (DI) water under a nitrogen atmosphere at 92° C., was added 7.3 g ammonium bicarbonate dissolved in 50 g water, 5.3 g ammonium persulfate dissolved in 50 g water and 160 g polymer seed latex (solids content 42%, average particle diameter 60 nm) followed by 30 g of DI water to form the reaction mixture to which the following monomer mixture was then added over 3 hours at 81° C. along with a solution of 2.1 g ammonium persulfate dissolved in 104 g DI water followed by 50 g of DI Water:

| Monomer mixture: | in grams (g) |
| --- | --- |
| water | 635 g |
| sodium lauryl sulfate | 9.1 g |
| butyl acrylate | 866 g |
| methylmethacrylate | 1207 g |
| methacrylic acid | 27 g |
| n-dodecylmercaptan | 26 g |

At the end of the polymerization, 0.01 g of $FeSO_4$ in 8.7 g of DI water, 0.44 g of the tetrasodium salt of ethylenediamine tetraacetic acid in 8.3 g of DI water, 1.2 g t-butylhydroperoxide in 20 g of DI water and 0.6 g isoascorbic acid in 40 g of DI water were added at 60° C. to the reaction product. Ammonium hydroxide was added to give a final pH=9.7. The resulting low molecular weight latex binder had a solids content of 53%, an average particle diameter of 194 nm, a GPC number average molecular weight of 20,000 and a Tg of 18° C.

EXAMPLE 2

To 825 g of deionized (DI) water under a nitrogen atmosphere at 91° C. was added 7.3 g ammonium bicarbonate dissolved in 50 g water, 5.3 g ammonium persulfate dissolved in 50 g water and 160 g polymer seed latex (solids content 42%, average particle diameter of 60 nm) followed by 30 g of DI water to form the reaction mixture to which the following monomer mixture was then added over 3 hours at 81° C. along with a solution of 2.1 g ammonium persulfate dissolved in 104 g DI water followed by 50 g of DI Water:

| Monomer mixture: | in grams (g) |
| --- | --- |
| DI water | 635 g |
| sodium lauryl sulfate | 9.1 g |
| butyl acrylate | 858 g |
| methylmethacrylate | 1110 g |
| acetoacetoxyethyl methacrylate | 105 g |
| methacrylic acid | 27 g |
| n-dodecylmercaptan | 26 g |

At the end of the polymerization, 0.01 g of $FeSO_4$ in 8.7 g of DI water, 0.44 g of the tetrasodium salt of ethylenediamine tetraacetic acid in 8.3 g of DI water, 1.2 g t-butylhydroperoxide in 20 g of DI water and 0.6 g isoascorbic acid in 40 g of DI water were added at 60° C. to the reaction product. Ammonium hydroxide was added to give a final pH=9.6. The resulting low molecular weight latex binder having acetoacetyl functional pendant moiety had a solids content of 52%, an average particle diameter of 199 nm, a GPC number average molecular weight of 20,100 and a Tg of 15° C.

EXAMPLE 3

To 825 g of deionized (DI) water under a nitrogen atmosphere at 92° C. was added 7.3 g ammonium bicarbonate dissolved in 50 g water, 5.3 g ammonium persulfate dissolved in 50 g water and 160 g polymer seed latex (solids content 42%, average particle diameter 60 nm) followed by 30 g of DI water to form a reaction mixture to which the following monomer mixture was then added over 3 hours at 81° C. along with a solution of 2.1 g ammonium persulfate dissolved in 104 g DI water followed by 50 g of DI Water:

| Monomer mixture: | in grams (g) |
| --- | --- |
| water | 635 g |
| sodium lauryl sulfate | 9.1 g |
| butyl acrylate | 866 g |
| methylmethacrylate | 1207 g |
| methacrylic acid | 27 g |

At the end of the polymerization, 0.01 g of $FeSO_4$ in 8.7 g of DI water, 0.44 g of the tetrasodium salt of ethylenediamine tetraacetic acid in 8.3 g of DI water, 1.2 g t-butylhydroperoxide in 20 g of DI water and 0.6 g isoascorbic acid in 40 g of DI water were added at 60° C. to the reaction product. Ammonium hydroxide was added to give a final pH=9.7. The resulting high molecular weight latex binder had a solids content of 53%, an average particle diameter of 194 run, a GPC number average molecular weight of 180,000 and a Tg of 18° C.

EXAMPLE 4

To 825 g of deionized (DI) water under a nitrogen atmosphere at 91° C. was added 7.3 g ammonium bicarbonate dissolved in 50 g water, 5.3 g ammonium persulfate dissolved in 50 g water and 160 g polymer seed latex (solids content 42%, average particle diameter of 60 nm) followed by 30 g of DT water to form a reaction mixture to which the following monomer mixture was then added over 3 hours at 81° C. along with a solution of 2.1 g ammonium persulfate dissolved in 104 g DI water followed by 50 g of DI Water:

| Monomer mixture: | in grams (g) |
| --- | --- |
| DI water | 635 g |
| sodium lauryl sulfate | 9.1 g |
| butyl acrylate | 858 g |
| methylmethacrylate | 1110 g |
| acetoacetoxyethyl methacrylate | 105 g |
| methacrylic acid | 27 g |

At the end of the polymerization, 0.01 g of $FeSO_4$ in 8.7 g of DI water, 0.44 g of the tetrasodium salt of ethylenediamine tetraacetic acid in 8.3 g of DI water, 1.2 g t-butylhydroperoxide in 20 g of DI water and 0.6 g isoascorbic acid in 40 g of DI water were added at 60° C. to the reaction product. Ammonium hydroxide was added to give a final pH=9.6. The resulting high molecular weight latex binder having acetoacetyl functional pendant moiety had a solids content of 52%, an average particle diameter of 199 nm, a GPC number average molecular weight of 180,000 and a Tg of 15° C.

EXAMPLE 5

To 825 g of deionized (DI) water under a nitrogen atmosphere at 91° C. was added 7.3 g ammonium bicarbonate dissolved in 50 g water, 5.3 g ammonium persulfate dissolved in 50 g water and 160 g polymer seed latex (solids content 42%, average particle diameter of 60 nm) followed by 30 g of DI water followed by 30 g of DI water to from a reaction mixture to which the following monomer mixture was then added over 3 hours at 81° C. along with a solution of 2.1 g ammonium persulfate dissolved in 104 g DI water followed by 50 g of DI Water:

| Monomer mixture: | in grams (g) |
| --- | --- |
| DI water | 635 g |
| sodium lauryl sulfate | 9.1 g |
| butyl acrylate | 858 g |
| methylmethacrylate | 1110 g |
| acetoacetoxyethyl methacrylate | 105 g |
| methacrylic acid | 27 g |
| n-dodecylmercaptan | 26 g |

At the end of the polymerization, 0.01 g of $FeSO_4$ in 8.7 g of DI water, 0.44 g of the tetrasodium salt of ethylenediamine tetraacetic acid in 8.3 g of DI water, 1.2 g t-butylhydroperoxide in 20 g of DI water and 0.6 g isoascorbic acid in 40 g of DI water were added at 60° C. to the reaction product. Ammonium hydroxide was added to give a final pH=9.6, which was followed with constant stirring by the addition at room temperature of 21 g of surfactant (Triton® X-405 Octyl phenoxy polyethoxyethanol supplied by Union Carbide Chemicals, Inc., Danbury, Conn. @ 70 percent solids by weight and 54.6 g of aminosilane (Dow Corning Z-6020® aminoethylaminopropyltrimethoxysilane supplied by Dow Corning Corporation, Midland, Mich., 99 0% solids by weight) dissolved in 151.2 g of methanol. The resulting aminosilane modified low molecular weight latex binder having acetoacetyl functional pendant moiety had a solids content of 52%, an average particle diameter of 199 nm, a GPC number average molecular weight of 16,200 and a Tg of 15° C.

EXAMPLE 6

To 825 g of deionized (DI) water under a nitrogen atmosphere at 91° C. was added 7.3 g ammonium bicarbonate dissolved in 50 g water, 5.3 g ammonium persulfate dissolved in 50 g water and 160 g polymer seed latex (solids content 42%, average particle diameter of 60 nm) followed by 30 g of DI water to from a reaction mixture to which the following monomer mixture was then added over 3 hours at 81° C. along with a solution of 2.1 g ammonium persulfate dissolved in 104 g DI water followed by 50 g of DI Water:

| Monomer mixture: | in grams (g) |
| --- | --- |
| DI water | 635 g |
| sodium lauryl sulfate | 9.1 g |
| butyl acrylate | 858 g |
| methylmethacrylate | 1110 g |
| acetoacetoxyethyl methacrylate | 105 g |
| methacrylic acid | 27 g |

At the end of the polymerization, 0.01 g of $FeSO_4$ in 8.7 g of DI water, 0.44 g of the tetrasodium salt of ethylenediamine tetraacetic acid in 8.3 g of DI water, 1.2 g t-butylhydroperoxide in 20 g of DI water and 0.6 g isoascorbic acid in 40 g of DI water were added at 60° C. to the reaction product. Ammonium hydroxide was added to give a final pH=9.6, which was followed with constant stirring by the addition at room temperature of 21 g of surfactant (Triton® X-405 Octyl phenoxy polyethoxyethanol supplied by Union Carbide Chemicals, Inc., Danbury, Conn. @ 70 percent solids by weight) and 54.6 g of aminosilane (Dow Corning Z-6020®aminoethylaminopropyltrimethoxysilane supplied by Dow Corning Corporation, Midland, Mich., 99 0% solids by weight) dissolved in 151.2 g of methanol. The resulting aminosilane modified high molecular weight latex binder having acetoacetyl functional pendant moiety had a solids content of 52%, an average particle diameter of 199 run, a GPC number average molecular weight of 180,000 and a Tg of 15 ° C.

EXAMPLE 7

To 825 g of deionized (DI) water under a nitrogen atmosphere at 91° C. was added 7.3 g ammonium bicarbonate dissolved in 50 g water, 5.3 g ammonium persulfate dissolved in 50 g water and 160 g polymer seed latex (solids content 42%, average particle diameter of 60 nm) followed by 30 g of DI water to from a reaction mixture to which the following monomer mixture was then added over 3 hours at 81° C. along with a solution of 2.1 g ammonium persulfate dissolved in 104 g DI water followed by 50 g of DI Water:

| Monomer mixture: | in grams (g) |
| --- | --- |
| DI water | 635 g |
| sodium lauryl sulfate | 9.1 g |
| butyl acrylate | 858 g |
| methylmethacrylate | 1110 g |
| methacrylic acid | 27 g |

At the end of the polymerization, 0.01 g of $FeSO_4$ in 8.7 g of DI water, 0.44 g of the tetrasodium salt of ethylenediamine tetraacetic acid in 8.3 g of DI water, 1.2 g t-butylhydroperoxide in 20 g of DI water and 0.6 g isoascorbic acid in 40 g of DI water were added at 60° C. to the reaction product. Ammonium hydroxide was added to give a final pH=9.6, which was followed with constant stirring by the addition at room temperature of 20 g of surfactant (Triton® X405 Octyl phenoxy polyethoxyethanol supplied by Union Carbide Chemicals, Inc., Danbury, Conn. @ 70 percent solids by weight) and 51.9 g of aminosilane (Dow Corning Z-6020® aminoethylaminopropyltrimethoxysilane supplied by Dow Corning Corporation, Midland, Mich., 99 0% solids by weight) dissolved in 143.6 g of methanol. The resulting aminosilane modified high molecular weight latex binder had a solids content of 52%, an average particle diameter of 199 nm, a GPC number average molecular weight of 180,000 and a Tg of 18 ° C.

EXAMPLE 8

To 825 g of deionized (DI) water under a nitrogen atmosphere at 92° C. was added 7.3 g ammonium bicarbonate dissolved in 50 g water, 5.3 g ammonium persulfate dissolved in 50 g water and 160 g polymer seed latex (solids content 42%, average particle diameter 60 nm) followed by 30 g of DI water to from a reaction mixture to which the following monomer mixture was then added over 3 hours at 81° C. along with a solution of 2.1 g ammonium persulfate dissolved in 104 g DI water followed by 50 g of DI Water:

| Monomer mixture: | in grams (g) |
| --- | --- |
| water | 635 g |
| sodium lauryl sulfate | 9.1 g |
| butyl acrylate | 866 g |
| methylmethacrylate | 1207 g |
| methacrylic acid | 27 g |
| n-dodecylmercaptan | 26 g |

At the end of the polymerization, 0.01 g of $FeSO_4$ in 8.7 g of DI water, 0.44 g of the tetrasodium salt of ethylenediamine tetraacetic acid in 8.3 g of DI water, 1.2 g t-butylhydroperoxide in 20 g of DI water and 0.6 g isoascorbic acid in 40 g of DI water were added at 60° C. to the reaction product. Ammonium hydroxide was added to give a final pH=9.7, which was followed with constant stirring by the addition at room temperature of 21 g of surfactant (Triton® X-405 Octyl phenoxy polyethoxyethanol supplied by Union Carbide Chemicals, Inc., Danbury, Conn. @ 70 percent solids by weight) and 54.6 g of aminosilane (Dow Corning Z-6020® aminoethylaminopropyltrimethoxysilane supplied by Dow Corning Corporation, Midland, Mich., 99 0% solids by weight) dissolved in 151.2 g of methanol. The resulting aminosilane modified low molecular weight latex binder had a solids content of 53%, an average particle diameter of 194 nm, a GPC number average molecular weight of 16,200 and a Tg of 18° C.

EXAMPLE 9

133.9 g of polyamine prepared in accordance with the following procedure was added to Example 1 to produce polyamine modified low molecular weight latex binder having a solids content of 53%, an average particle diameter of 194 nm, a GPC number average molecular weight of 16,200 and a Tg of 18° C.

Polyamine preparation:

A five liter stirred reactor containing 1500 grams of deionized and deoxygenated water was heated to 60° C. under nitrogen. Seven grams of 0.15% aqueous $FeSO_4 \cdot 7H_2O$ solution and 2.0 grams of a 1% aqueous tetra sodium salt of ethylene diamine tetraacetic add were added to the reactor. Feeds Nos. 1 and 2, listed below, were then simultaneously added to the reactor over a 3 hour period:

Feed No. 1

500.0 grams 2-(3-oxazolidinyl)ethyl methacrylate (OXEMA)

500.0 grams deionized water 5.0 grams 70% aqueous tertiary-butyl hydroperoxide (TBHP)

Feed No. 2

5.0 grams sodium formaldehyde sulfoxylate•$H_2O$ (SFS) diluted with 14.4 mL DI water.

One hour after the addition of Feed Nos. 1 and 2, 0.65 grams of 70% TBHP and 0.15 grams SFS in 5.0 grams of DI water were added to the reactor. On hour thereafter, the reactor contents were cooled to room temperature, and 10.0 grams of 29% aqueous ammonium hydroxide were added to yield a clear amber solution of total solids content at 19.6%, pH 8.3 and Brookfield viscosity (determined by using No. 1 spindle running @ 60 rpm) of 21 cps.

EXAMPLE 10

Same procedure, as that described in Example 9 was used to produce composition of Example 10 except the latex binder of Example 1 was replaced with the latex binder of Example 3 to produce polyamine modified high molecular weight latex polymer having a solids content of 53%, an average particle diameter of 194 nm, a GPC number average molecular weight of 180,000 and a Tg of 18° C.

EXAMPLE 11

To 3713 g of deionized (DI) water under a nitrogen atmosphere at 92° C. was added 32.8 g ammonium bicarbonate dissolved in 180 g water, 23.8 g ammonium persulfate dissolved in 180 g water and 720 g polymer seed latex (solids content 42%, average particle diameter 60 nm) followed by 135 g of DI water to from a reaction mixture to which the following monomer mixture was then added over 3 hours at 81° C. along with a solution of 9.5 g ammonium persulfate dissolved in 468 g DI water followed by 225 g of DI water:

| Monomer mixture: | in grams (g) |
| --- | --- |
| water | 2858 g |
| sodium lauryl sulfate | 33.5 g |
| butyl acrylate | 3825 g |
| methylmethacrylate | 4558 g |
| acetoacetoxyethyl methacrylate | 945 g |
| methacrylic acid | 122 g |
| n-dodecylmercaptan | 118.4 g |

Following addition of the monomer mixture, 0.06 g $FeSO_4$ in 39.3 g of DI water and 1.97 g of the tetrasodium salt of ethylenediamine tetraacetic acid in 31.6 g of DI water and a total of 7.8 g t-butylhydroperoxide in 90 g of DI water and a total of 2.8 g isoascorbic acid in 180 g of DI water were added at 60° C. to polymerize the monomer mixture. Ammonium hydroxide was added to give a final pH=9.7. The resulting aminosilane modified low molecular weight latex binder having acetoacetyl functional pendant moiety had a solids content of 53%, an average particle diameter of 194 nm, a GPC number average molecular weight of 16,200 and a Tg of 14° C.

EXAMPLE 12

To 3713 g of deionized (DI) water under a nitrogen atmosphere at 92° C. was added 32.8 g ammonium bicarbonate dissolved in 180 g water, 23.8 g ammonium persulfate dissolved in 180 g water and 720 g polymer seed latex (solids content 42%, average particle diameter 60 nm) followed by 135 g of DI water to from a reaction mixture to which the following monomer mixture was then added over 3 hours at 81° C. along with a solution of 9.5 g ammonium persulfate dissolved in 468 g DI water followed by 225 g of DI water:

| Monomer mixture: | in grams (g) |
|---|---|
| water | 2858 g |
| sodium lauryl sulfate | 33.5 g |
| butyl acrylate | 3825 g |
| methylmethacrylate | 4558 g |
| acetoacetoxyethyl methacrylate | 945 g |
| methacrylic acid | 122 g |
| n-dodecylmercaptan | 118.4 g |

Following addition of the monomer mixture, 0.06 g $FeSO_4$ in 39.3 g of DI water and 1.97 g of the tetrasodium salt of ethylenediamine tetraacetic acid in 31.6 g of DI water and a total of 7.8 g t-butylhydroperoxide in 90 g of DI water and a total of 2.8 g isoascorbic acid in 180 g of DI water were added at 60° C. to polymerize the monomer mixture. Ammonium hydroxide was added to give a final pH=9.7, which was followed with constant stirring by the addition at room temperature of 94.5 g of surfactant (Triton® X-405 Octyl phenoxy polyethoxyethanol supplied by Union Carbide Chemicals, Inc., Danbury, Conn. @ 70 percent solids by weight) and 491.4 g of aminosilane (Dow Corning Z-6020® aminoethylaminopropyltrimethoxysilane supplied by Dow Corning Corporation, Midland, Mich., 99 0% solids by weight) dissolved in 680.4 g of methanol. The resulting aminosilane modified low molecular weight latex binder having acetoacetyl functional pendant moiety had a solids content of 53%, an average particle diameter of 194 nm, a GPC number average molecular weight of 16,200 and a Tg of 14° C.

To Examples 1 through 12, the following components were added in the order to shown to produce respective pigmented traffic paint compositions:

| Material | Amount (grams per liter) |
|---|---|
| Examples 1 through 12 in DI water | 463.5 |
| (227.3 g of this mix was polymer solids of Examples 1 through 12) | |
| Dispersant[1] | 7.1 |
| Surfactant[2] | 2.8 |
| Defoamer[3] | 5.6 |
| White Pigment[4] | 100.1 |
| Extender[5] | 739.7 |

Unless stated otherwise, the following commercial components were used:
[1]Tamol ® 901 Dispersant, an ammonium salt of an polyelectrolyte supplied by Rohm and Haas Company, Philadelphia, Pennsylvania @ 30 percent based on the solids.
[2]Surfynol ® CT-136 Surfactant, an acetylenic surfactant supplied by Air Products and Chemicals, Inc., Allentown, Pennsylvania.
[3]Drew ® L-493 Defoamer supplied by Drew Chemical Company, Boonton, New Jersey.
[4]Ti Pure ® R-900 Titanium dioxide supplied by E.I. duPont de Nemours & Company, Wilmington, Delaware.
[5]Omyacarb ® 5, Ground natural calcium carbonate, evaluated under ASTM D 1199, Type GC, Grade II having a number average particle size of 5.5 microns with maximum oil absorption No. of 10, supplied by Omya, Inc., Proctor, Vermont.

The components were mixed for 10 minutes or until smooth (the fineness of grind as tested according to ASTM D1210 of not less than 3 Hegman units) to form a mix.

The following components were added in the order shown with continuous mixing to Examples 1, 2, 3 4, 9, 10 and 11:

| Material | Amount (grams per liter) |
|---|---|
| Methanol | 29.9 |
| DI water | 14.2 |
| Coalescing agent[6] | 22.6 |
| Rheology Modifier[7] | 0.06 |

Unless stated otherwise, the following commercial components were used:
[6]Texanol ® Ester alcohol supplied by Eastman Chemicals, Kingsport, Tennessee.
[7]QR-708 ® Rheology Modifier supplied by Rohm and Haas Co., Philadelphia, Pennsylvania @ 35 percent solids by weight.

The following components were added in the order shown with continuous mixing to Examples 5, 6, 7 4, 8 and 12:

| Material | Amount (grams per liter) |
|---|---|
| Methanol | 16.3 |
| DI water | 31.2 |
| Coalescing agent[6] | 22.6 |
| Rheology Modifier[7] | 0.06 |

Wear Resistance Evaluation

Examples 1, 3, 9 and 10 were evaluated to determine the effect of the GPC number average molecular weight of the latex binder of the traffic paint composition being used in the method of the present invention, and the effect of the presence or absence of polyamine in the traffic paint composition on the wear resistance of the traffic paint composition. The results are tabulated below:

TABLE 1

| Example | Polymer Molecular Weight | Percent by weight of polyamine | Paint area in percentage remaining on road surface No glass beads added | Paint area in percentage remaining on road surface Glass beads added |
|---|---|---|---|---|
| Example 1 | low | 0 | 50 | 65 |
| Example 3 | high | 0 | 0 | 0 |
| Example 9 | low | 1.25 | 75 | 80 |
| Example 10 | high | 1.25 | 35 | 55 |

From Table 1, it is seen that applicants have unexpectedly discovered that the low molecular weight traffic paint composition of Example 1 has better wear resistance than the high molecular weight composition of Example 3 or the polyamine modified high molecular weight traffic paint composition of Example 10. Furthermore, applicants have unexpectedly discovered that polyamine modified low molecular weight traffic paint composition of Example 9 has even better wear resistance than the low molecular weight traffic paint composition of Example 1.

The pigmented versions of traffic paint compositions of Examples 1, 2, 3, 4, 5, 6, 7 and 8, as described earlier, were applied to the road surfaces under the application procedure described earlier to determine the effect of molecular weight and the presence or absence of aminosilane and acetoacetyl functional pendant moiety in the traffic paint composition on the wear resistance of the resulting traffic marking. The results are tabulated below in Table 2:

TABLE 2

| Example | Polymer Molecular Weight | Percent by weight of acetoacetyl | Percent by weight of aminosilane | Paint area in percentage remaining on road surface No glass beads added | Paint area in percentage remaining on road surface Glass beads added |
|---|---|---|---|---|---|
| Example 1 | low | 0 | 0 | 50 | 65 |
| Example 2 | low | 5.0 | 0 | 40 | 65 |
| Example 3 | high | 0 | 0 | 0 | 0 |
| Example 4 | high | 5.0 | 0 | 0 | 0 |
| Example 5 | low | 5.0 | 2.6 | 75 | 80 |
| Example 6 | high | 5.0 | 2.6 | 60 | 70 |
| Example 7 | high | 0 | 2.6 | 40 | 60 |
| Example 8 | low | 0 | 2.6 | 70 | 70 |

From Table 2, it is seen that applicants have unexpectedly discovered that wear resistance of traffic paint composition is improved with the inclusion of aminosilane, especially with traffic paint composition having acetoacetyl functional pendant moiety.

The Evaluation of the Effect Coagulating the Layer

The pigmented versions of traffic paint compositions of Examples 1, 2, 5, 6, 7, 8, 9 and 10 were applied over 10 cms×30 cms glass test panels to form the layer of the traffic paint composition thereon. The thickness of the layer was controlled in such a way that the resultant (after drying) traffic marking thereon would have a film thickness varying from 175 to 200 micrometers. Each layer of the traffic paint composition was then sprayed with citric acid @ 30 percent strength, as a coagulant, to determine the effect of coagulating the layer of the traffic paint composition on the no-pick-up time of the resultant traffic marking. As a control, the no-pick-up time of a layer sprayed with a coagulant was compared to a layer not exposed to a coagulant. The results are tabulated below in Table 3:

TABLE 3

| Example | Polymer Molecular Weight | Percent by weight of acetoacetyl | Percent by weight of aminosilane | Percent by weight of polyamine | No-pick-up time* in minutes with coagulant# | No-pick-up time* in minutes without coagulant# |
|---|---|---|---|---|---|---|
| Example 1 | low | 0 | 0 | 0 | 5 | 13 |
| Example 2 | low | 5 | 0 | 0 | 6 | 16 |
| Example 5 | low | 5 | 2.6 | 0 | 5 | 14 |
| Example 6 | high | 5 | 2.6 | 0 | 2 | 6 |
| Example 7 | high | 0 | 2.6 | 0 | 2 | 5 |
| Example 8 | low | 0 | 2.6 | 0 | 3 | 10 |
| Example 9 | low | 0 | 0 | 1.25 | 1 | 2 |
| Example 10 | high | 0 | 0 | 1.25 | 1 | 2 |

*measured @ relative humidity held within 60 to 65 percent
Citric acid was used as a coagulant Table 3 demonstrates that the no-pick-up time for all the Examples was improved by added a coagulating step to the method of the present invention.

Evaluation of Dry-Through Time

The pigmented versions of the traffic paint compositions of Examples 5, 6, 8, 9, 10, 11 and 12 were evaluated for the dry-through time, the result of which are tabulated in Table 4 below:

TABLE 4

| Examples | Polymer Molecular Weight | Percent by weight of acetoacetyl | Percent by weight of aminosilane | Percent by weight of polyamine | Dry-through Time in minutes |
|---|---|---|---|---|---|
| Example 5 | low | 5 | 2.6 | 0 | 90 |
| Example 6 | high | 5 | 2.6 | 0 | 70 |
| Example 8 | low | 0 | 2.6 | 0 | 60 |
| Example 9 | low | 0 | 0 | 1.25 | 60 |
| Example 10 | high | 0 | 0 | 1.25 | 60 |
| Example 11 | low | 10 | 0 | 0 | 240 |
| Example 12 | low | 10 | 5.2 | 0 | 70 |

From Table 4 it can be seen that applicants have made an unexpected discovery that the presence of aminosilane or polyamine in a traffic paint composition having either with high or low GPC number average molecular weights significantly improves the dry-through time.

What is claimed is:

1. A method for producing a wear resistant traffic marking on a road surface comprising;

applying on said road surface a layer of a traffic paint composition containing a latex binder in an aqueous evaporable carrier, said latex binder having a Tg in the range varying from 0° C. to 60° C., a gel permeation chromatography number average molecular weight in the range varying from 1,000 to less than 30,000; and evaporating said aqueous evaporable carrier from said layer to form said wear resistant traffic marking on said road surface, said layer having a no-pick-up time, as evaluated under ASTM D711-89, varying in the range of from 1 minute to 60 minutes at a relative humidity in the range of from 65 to 90 percent.

2. The method of claim 1 wherein said latex binder is a dispersion of polymer particles in said aqueous evaporable carrier or a polymer dissolved in said aqueous evaporable carrier.

3. The method of claim 1 further comprising adding a base to said aqueous evaporable carrier to provide said latex binder with an enamine functional pendant moiety, said enamine functional pendant moiety resulting from a reaction of an acetoacetyl functional pendant moiety on said latex polymer with said base.

4. The method of claim 3 further comprising polymerizing said latex binder from 0.5 to 100 percent by weight of binder solids of an acetoacetyl functional monomer having the following structure:

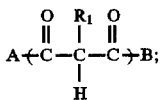

wherein A is either:

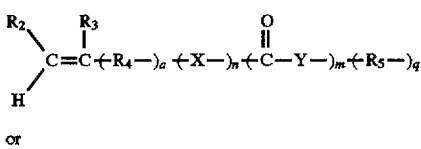

or

-continued

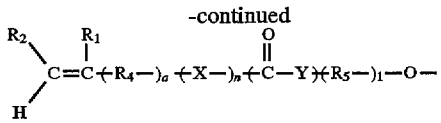

wherein
R$_1$ is either H, alkyl having 1 to 10 carbon atoms or phenyl,
R$_2$ is either H, alkyl having 1 to 10 carbon atoms or phenyl, halo, CO$_2$CH$_3$, or CN;
wherein
R$_3$ is either H, alkyl having 1 to 10 carbon atoms or phenyl, or halo;
wherein
R$_4$ is either alkylene having 1 to 10 carbon atoms or phenylene;
wherein
R$_5$ is either alkylene having 1 to 10 carbon atoms or phenylene;
wherein
a, m, n, and q is either 0 or 1;
wherein
each of X and Y is either —NH— or —O—; and
wherein
B is either A, alkyl having 1 to 10 carbon atoms or phenyl or heterocyclic.

5. The method of claim 3 wherein said acetoacetyl functional pendant moiety is selected from the group consisting of acetoacetoxyethyl methacrylate, acetoacetoxyethyl acrylate, acetoacetoxypropyl methacrylate, allyl acetoacetate, acetoacetoxybutyl methacrylate, 2,3-di(acetoacetoxy)propyl methacrylate, or combinations there of to add said acetoacetyl functional pendant moiety on said polymer.

6. The method of claim 3 further comprising adding an aminosilane to said aqueous evaporable carrier wherein said aminosilane is selected from the group consisting of N-methylaminopropyltrimethoxysilane, aminoethylaminopropylmethyldimethoxysilane, aminoethylaminopropyltrimethoxysilane, aminopropylmethyldimethoxysilane, aminopropyltrimethoxysilane, polymeric aminoalkylsilicone, aminoethylaminoethylaminopropyltrimethoxysilane, N-methylaminopropyltrimethoxysilane, aminopropylmethyldimethoxysilane, aminopropyltriethoxysilane, 4-aminobutyltriethoxysilane, oligomeric aminoalkylsilane, and various combinations thereof.

7. The method of claim 1, 2 or 3 further comprising polymerizing said latex binder from 0.5 to 100 percent by weight of binder solids of an acid functional monomer to provide said binder with an acid number in the range of from 0.1 to 390, said acid functional monomer being selected from the group consisting of phosphoethyl methacrylate, acrylic acid, fumaric acid-monoethyl ester, fumaric acid, itaconic acid, maleic acid, methacrylic acid, fumaric acid-monomethyl ester, methyl hydrogen maleate, and combinations thereof.

8. The method of claim 1, 2 or 3 further comprising dropping glass beads on said layer to make said traffic marking reflective to light.

9. The method of claim 3, wherein said traffic paint composition further comprising:
   (a) a blend of said latex binder with 0 to 20 weight percent based on the total weight of binder solids of a polyfunctional amine, or
   (b) an amine modified latex binder, or
   (c) a combination of said blend and said amine modified latex binder,
   wherein said latex binder and said amine modified latex binder are anionically stabilized, and
   wherein said aqueous evaporable carrier comprises an amount of a volatile base sufficient to raise the pH of said aqueous evaporable carrier to a point where essentially all of said polyfunctional amine in said blend, or essentially all of said amine modified latex binder, or essentially all of said combination of said blend and said amine modified latex binder is in a deprotonated state.

10. The method of claim 1, 2 or 3 further comprising contacting said layer with a coagulant to improve the no-pick-up dry time of said traffic marking.

11. The method of claim 1 or 2, wherein said traffic paint composition further comprising
   (a) a volatile base added to said aqueous evaporable carrier; and
   (b) a blend of said latex binder with 0 to 20 weight percent based on the total weight of binder solids of a polyfunctional amine, or
   (c) an amine modified latex binder, or
   (d) a combination of said blend and said amine modified latex binder,
   wherein said latex binder and said amine modified latex binder are anionically stabilized, and
   wherein said aqueous evaporable carrier comprises an amount of said volatile base sufficient to raise the pH of said aqueous evaporable carrier to a point where essentially all of said polyfunctional amine in said blend, or essentially all of said amine modified latex binder, or essentially all of said combination of said blend and said amine modified latex binder is in a deprotonated state.

12. A method for producing a wear resistant traffic marking on a road surface comprising:
   applying on said road surface a layer of a traffic paint composition containing an aminosilane added to an aqueous evaporable carrier maintained at a pH in the range of from of 7.5 to 11.0 and having dispersed therein particles of a latex binder bearing an add functional pendant moiety and an enamine functional pendant moiety, wherein said enamine functional pendant moiety results from the reaction of an acetoacetyl functional pendant moiety on said latex binder with ammonia or amine, said binder having a Tg in range varying from 0° C. to 60° C., a gel permeation chromatography number average molecular weight in the range varying from 1,000 to 1000,000, and an acid number in the range varying from 0.1 to 390; and
   evaporating said aqueous evaporable carrier from said layer to form said traffic marking having improved wear resistance, said layer having a no-pick-up time, as evaluated under ASTM D711-89, varying in the range of from 1 minute to 60 minutes at a relative humidity in the range of from 65 to 90 percent.

13. The method of claim 12, wherein said gel permeation chromatography number average molecular weight of said binder varies from more than 30,000 to 700,000.

14. The method of claim 12 wherein said traffic paint composition further comprising:
   (a) a blend of said latex binder with 0 to 20 weight percent based on the total weight of said binder solids of a polyfunctional amine, or
   (b) an amine modified latex binder, or
   (c) a combination of said blend and said amine modified latex binder,
   wherein said latex binder and said amine modified latex binder are anionically stabilized, and
   wherein said aqueous evaporable carrier comprises an amount of a volatile base sufficient to raise the pH of said aqueous evaporable carrier to a point where essentially all of said polyfunctional amine in said blend, or essentially of said amine modified latex binder, or essentially all of said combination of said blend and said amine modified latex binder is in a deprotonated state.

15. The method of claim 12 further comprising contacting said layer with a coagulant to improve the no-pick-up dry time of said traffic marking.

16. A method for producing a wear resistant traffic marking on a road surface comprising:
   applying on said road surface a layer of a traffic paint composition containing an aqueous evaporable carrier having dispersed therein particles of a latex binder bearing an acid functional pendant moiety and an enamine functional pendant moiety, wherein said enamine functional pendant moiety results from the reaction of an acetoacetyl functional pendant moiety on said latex binder with ammonia or amine, said binder having a Tg in range varying from 0° C. to 60° C., a gel permeation chromatography number average molecular weight in the range varying from 1,000 to 1000,000 and an acid number in the range varying from 0.1 to 390, and
   (a) a blend of said latex binder with 0 to 20 weight percent based on the total weight of binder solids of a polyfunctional amine, or
   (b) an amine modified latex binder, or
   (c) a combination of said blend and said amine modified latex binder,
   wherein said latex binder and said amine modified latex binder are anionically stabilized, and
   wherein said aqueous evaporable carrier comprises an amount of a volatile base sufficient to raise the pH of said aqueous evaporable carrier to a point where essentially all of said polyfunctional amine in said blend, or essentially all of said amine modified latex binder, or essentially all of said combination of said blend and said amine modified latex binder is in a deprotonated state; and evaporating said aqueous evaporable carrier from said layer to form said traffic marking having improved wear resistance, said layer having a no-pick-up time, as evaluated under ASTM D711-89, varying in the range of from 1 minute to 60 minutes at a relative humidity in the range of from 65 to 90 percent.

17. The method of claim 16 wherein said aqueous evaporable carrier further includes aminosilane.

18. The method of claim 12 or 16 further comprising contacting said layer with a coagulant to improve the no-pick-up dry time of said layer.

* * * * *

UNITED STATES PATENT AND TRADEMARK OFFICE
CERTIFICATE OF CORRECTION

PATENT NO : 5,672,379
DATED : September 30, 1997
INVENTOR(S) : Donald Craig Schall et al.

It is certified that error appears in the above-identified patent and that said Letters Patent is hereby corrected as shown below:

Col. 8, line 16, change "1" to -- $q$ --

Col. 28, line 19, change "1" to -- $q$ --.

Signed and Sealed this

Twelfth Day of January, 1999

Attest:

Attesting Officer     *Acting Commissioner of Patents and Trademarks*